(12) United States Patent
Stiles et al.

(10) Patent No.: US 6,393,490 B1
(45) Date of Patent: *May 21, 2002

(54) METHOD AND SYSTEM FOR A PROGRAMMATIC FEEDBACK PROCESS FOR END-USER SUPPORT

(76) Inventors: Ian James Stiles, 353 S. 100 East, Salem, UT (US) 84653; Paul B. Ahlstrom, 7911 S. DaVinci Dr., Salt Lake City, UT (US) 84121

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,319

(22) Filed: Dec. 18, 1997

(51) Int. Cl.⁷ ................................................. G06F 11/00
(52) U.S. Cl. ........................... 709/313; 714/15; 714/31; 714/33; 714/37; 714/38; 714/340; 345/326
(58) Field of Search ................................. 709/224, 313, 709/310; 379/15; 707/10; 714/38, 37, 31, 33, 340, 15; 345/326

(56) References Cited

U.S. PATENT DOCUMENTS

| | | | | |
|---|---|---|---|---|
| 4,910,663 A | | 3/1990 | Bailey | 364/200 |
| 5,218,605 A | * | 6/1993 | Low et al. | 714/45 |
| 5,313,616 A | | 5/1994 | Cline et al. | 395/500 |
| 5,333,302 A | * | 7/1994 | Hensley et al. | 714/37 |
| 5,367,473 A | | 11/1994 | Chu et al. | 364/551.01 |
| 5,371,883 A | * | 12/1994 | Gross et al. | 714/38 |
| 5,446,883 A | * | 8/1995 | Kirkbride et al. | 707/10 |
| 5,463,764 A | * | 10/1995 | Mueller | 714/38 |
| 5,463,768 A | * | 10/1995 | Cuddihy et al. | 714/37 |
| 5,490,089 A | * | 2/1996 | Smith et al. | 399/81 |
| 5,513,315 A | * | 4/1996 | Tierney et al. | 714/37 |
| 5,542,047 A | * | 7/1996 | Armstrong | 709/224 |
| 5,566,339 A | * | 10/1996 | Perholtz et al. | 713/340 |
| 5,602,982 A | | 2/1997 | Judd et al. | 395/326 |
| 5,621,886 A | * | 4/1997 | Alpert et al. | 714/38 |
| 5,633,909 A | * | 5/1997 | Fitch | 379/15 |
| 5,659,732 A | | 8/1997 | Kirsch | 395/605 |
| 5,671,351 A | * | 9/1997 | Wild et al. | 714/38 |
| 5,675,510 A | | 10/1997 | Coffey et al. | 364/514 A |
| 5,708,774 A | * | 1/1998 | Boden | 714/38 |
| 5,745,767 A | * | 4/1998 | Rosen et al. | 395/704 |
| 5,754,759 A | * | 5/1998 | Clarke et al. | 714/37 |
| 5,754,760 A | * | 5/1998 | Warfield | 714/38 |

(List continued on next page.)

OTHER PUBLICATIONS

Girgensohn "Agent–Based Support for Communication between Developers and Users in Software Design" IEEE pp. 22–29, 1994.*

Fetz et al. "User Interface and Quality Planning Department—AT & T Bell Laboratories" ACM pp. 83–84, 1990.*

Primary Examiner—Valencia Martin-Wallace
Assistant Examiner—Yveste Cherubin
(74) Attorney, Agent, or Firm—Lloyd W. Sadler

(57) ABSTRACT

A method for supporting the end-user of a software application program is provided, wherein the end-user is provided the capability of communicating directly with the application program vendor and/or developer to request enhancement, provide comments, report defects and/or to ask questions. Moreover, this method provides an automatic communication that provides the developer of an application program such critical information as usage of program or document information, defects, and user comments. This invention provides a technique that minimizes the load and/or requirements for specially trained customer service personnel while simultaneously decreasing the feed-back lag time, thereby providing information, which is sufficiently timely to aid in the improvement of the quality of application software.

15 Claims, 4 Drawing Sheets

U.S. PATENT DOCUMENTS

| | | | | |
|---|---|---|---|---|
| 5,796,952 A | * | 8/1998 | Davis et al. | 709/224 |
| 5,812,780 A | * | 9/1998 | Chen et al. | 709/224 |
| 5,862,322 A | * | 1/1999 | Anglin et al. | 395/185.1 |
| 5,905,855 A | * | 5/1999 | Klaiber et al. | 714/31 |
| 5,938,729 A | * | 8/1999 | Cote et al. | 709/224 |
| 6,065,136 A | * | 5/2000 | Kuwabara | 714/31 |
| 6,134,674 A | * | 10/2000 | Ahasheh | 714/33 |
| 6,279,124 B1 | * | 8/2001 | Brouwer et al. | 714/38 |

* cited by examiner

METHOD AND SYSTEM FOR A PROGRAMMATIC FEEDBACK PROCESS FOR END-USER SUPPORT

BACKGROUND OF THE INVENTION

1. Field of the Invention

This invention relates to computer communication systems, that is for communication between software users and software developers. More specifically, this invention relates to systems for communicating information concerning software program usage, comments, suggestions and defects from software users to software program developers which take advantage of computer networks, electronic mail services, and automated software reporting means to provide to provide feed-back information to software program developers.

2. Description of Related Art

A variety of techniques have been developed for providing feed-back to computer software developers including stand-alone debuggers, web page hits and usage reporters, telephone support centers and e-mail electronic support services. Such techniques may provide support and feedback in the limited application in which it is applied, however, automatic coordination and reporting of information from a wide variety of sources without undue human intervention is not generally available in any of these techniques. Certain technologies have been proposed to address feed-back information communication concerning software and/or computer systems, including: a system which measures and reports the use of a personal computer by a user through a log file; a database system which reports the frequency of search queries and the occurrences of terms; a training and testing system that runs concurrently with a target software application program, which asks the user to perform a series of application functions and monitors the user's responses; an expert system for tuning the performance of a large scale software system; a method for verifying the conformance of an application program to a set of system rules; and a computer program that measures the execution of machine code instructions in an executing program. For general background material, the reader is directed to U.S. Pat. Nos. 4,910,663, 5,313,616, 5,367,473, 5,602,982, 5,659,732, 5,675,510, each of which is hereby incorporated by reference in its entirety for the material disclosed therein.

SUMMARY OF THE INVENTION

It is desirable to provide a method and system which facilitates the communication of feed-back information to a software developer, including specifically the communication of which sections of the software program are most useful or are not used and which program defects are the most troublesome to users and to provide such information with minimal human interaction, minimal time delay, and minimal interference with the user's computer system or the application program being monitored. Such information assists developers in managing, maintaining and improving the quality of computer programs. It is also desirable to provide software users with feed-back as to defects that have been identified along with expected fix dates. Similarly it is desirable to have a software quality control system in which defects can be reproduced by a software developer with minimal user interaction, thus enabling a more timely defect repair response time. It is desirable to have a means for requesting and logging feature requests from users, so that developers can prioritize requested features for inclusion in future software updates. Moreover, it is desirable to provide an automated software quality control system which is capable of coordinating information received from a variety of sources and a variety of users and presenting such information to the software developer, while simultaneously reducing the burden on human support centers.

Accordingly, it is the primary object of this invention to provide a method and system for communicating software program feed-back from a user to a software program developer.

Another object of this invention is to provide a method and system for communicating software program use statistics.

A further object of this invention is to provide a method and system for communicating defects from computer software users to the computer software developer.

A still further object of this invention is to provide a method and system for communicating defect identification and correction status to software program users from software program developers.

Another object of this invention is to provide a method and system for receiving and logging feature requests from software program users for use by software program developers.

It is still another object of this invention to provide a method and system for communicating feed-back information between software users and developers which is automated and requires minimal human interaction.

A still further object of this invention is to provide a method and system for communicating feed-back information to a software program developer which minimizes the impact on the performance of the user's computer system and software program.

A further object of this invention is to provide a method and system for facilitating communication between software program users and software program developers which reduces the burden on human support centers.

Additional objects, advantages, and other novel features of the invention will be set forth in part in the description that follows and in part will be apparent to those of ordinary skill in the art upon examination of the following or may be learned with the practice of the invention. The objects and advantages of this invention may be realized and attainted by means of the instrumentalities and combinations particularly pointed out in the appended claims.

To achieve the foregoing and other objectives, and in accordance with the purposes of the present invention, a computer program is provided which is capable of searching, ranking, sorting and displaying information contained within a computer database, and which tracks usage information, using the usage information to affect the relevance ranking algorithm. The primary functional sections of the preferred computer program embodiment of the invention include: an initialization routine; an error detection routine; a software timer; an user interface control routine; an event logging routine; and a statistics categorization routine. Commercially available Internet communications software along with the Internet itself provides the preferred communication channel.

The preferred embodiment of this invention is designed to be used on any standard computer system that is linked by a network or other communication means to another computer system. Information is collected and communicated to a monitoring system, which is capable of producing usage reports, features request reports, defect reproduction step reports and user comment reports. Usage information is gathered and communicated without user intervention. While feature requests, defect reports, comments and questions are sent after being created or initiated by the user. In the preferred embodiment, a software button or menu item is provided in the application software, preferably with the label "Empowerment." When a user selects this button or menu item a dialog window is opened and the user is provided with a choice for selection of the type of communication, for example: defect report, feature request, comment, and/or question, and an edit control (pre-initialized with the user's e-mail address) for a reply-to-e-mail address and an edit control for user created text. The dialog may be exited by either engaging a "send" button or a "cancel" button. The engagement of the "send" button will cause the information to be sent to the developer while providing the user with a status window for the process.

Through the use of this invention a computer program user is able to provide requests or comments, describe program defects, or ask questions of the developer, all in a manner which is integrated with the application program and which is communicated directly with the vendor of the software. This direct form of user feed-back both provides an efficient and direct method of gathering important information by the program developer and enhances the relationship between the vendor of the software and the user by giving the user a feeling of control and empowerment with respect to the application software program at issue.

BRIEF DESCRIPTION OF THE DRAWINGS

The accompanying drawings incorporated in and forming a part of the specification of this invention, illustrates several aspects of the present invention, and together with the description serves to explain the principles of the invention. In the drawings.

Figure 1:
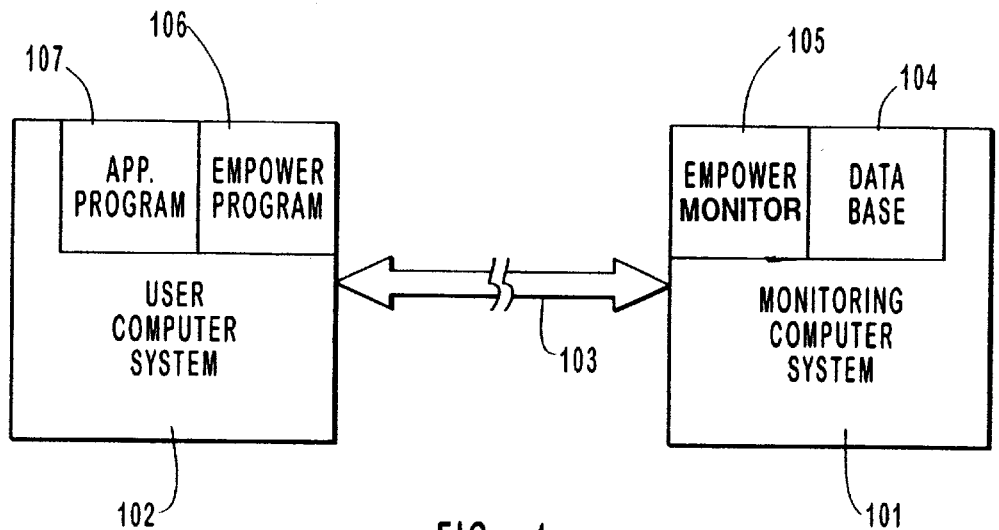
FIG. 1 is a system level block diagram of this invention.

Reference will now be made in detail to the present preferred embodiment of the invention, an example of which is illustrated in the accompanying drawings.

DETAILED DESCRIPTION OF THE INVENTION

This invention is a process for enabling communication between computer software users and computer software developers. This invention provides a solution to the software development problem of providing the developer with direct information concerning the usefulness and functionality of his or her application program. This invention also provides the application software user with the means of commenting on and inquiring about a particular program. Moreover, this invention provides the capability for the software vendor to automatically provide defect information, up-grade information, fix schedules and help information to customers, thereby improving customer relations in a cost effective manner.

This invention is typically practiced with standard commercially available computer hardware, software and communication equipment. This invention requires that the user have access to a digital computer system and an electronic communication means. It also requires that the developer or vendor have access to a digital computer system and the means of sending and receiving messages to and from the user. A computer network with an Internet electronic mail (e-mail) service may be used for the communication means, or a simple dial up telephone modem connection can alternatively be used.

For the purposes of this description the following terms should be interpreted to mean as follows.

Application program is software which is designed to interact with the user to perform a specific function.

Computer hardware includes the physical components of a digital computer system and may include: a processor, memory, a display, a printer, a key board or other user input device, a modem or other communication device, a disk drive or other long term storage device, and the necessary electrical connections between all of the above.

Developer is the author or developer of the application program.

Program is a general term for software.

Software is programmed instructions which work with digital computer hardware to perform a given function.

Vendor is the manufacturer, distributor or supplier of a program.

User is a person or entity which makes use of an application program and who uses the process of this invention to communicate with the developer or vendor of the application program.

In the preferred embodiment of this invention, this process is performed in both the user's computer system and the vendor or developer's computer system, by a specific computer program. In the preferred embodiment, this specific computer program is coded in the Pascal computer language and is compiled to correctly execute on the desired computer hardware. A software appendix is provided at the conclusion of this detailed description to enable those of ordinary skill in the art to use the current best mode of the invention. It should be noted that the software included in the software appendix provides only the sections of the invention that are not otherwise commonly available commercially. Such sections are linked in to provide standard interface, control and similar functions. It is envisioned that this invention could be practiced in a variety of ways, including but not limited to: alternative program languages, such as assembly code, C, C++, Fortran, Java, etc.; firmware or specially designed hardware; and/or some combination of the two. Therefore, the reader should consider the software appendix as exemplary of the current best mode of the invention and not as limiting the scope of the invention. Likewise, the following description of the invention is intended to provide the current preferred mode of the invention. The scope and limitations of this invention are found in the claims which follow this detailed description.

FIG. 1 shows a system level block diagram of the minimum preferred embodiment of the invention. A monitoring computer system 101 is provided wherein the vendor or developer communicates with the user computer system 102 and where the data base and reporting functions of the invention are performed. The preferred monitoring computer system 101 and the preferred user computer system 102 are standalone digital computers, having a processor, memory, a display and an input device. Typically, such computers are known in the industry as PCs or personal computers. Alternatively, this invention could also operate where the monitoring computer system 101 and/or the user computer system 102 are work stations, mini-computers, main frame computers and the like. Communication 103 between the user computer system 102 and the monitoring computer system 101 is provided. In the preferred embodiment of the invention this communication 103 is an Internet connection which provide electronic mail (e-mail) service to both the user and the vendor and/or developer. Alternatively, this invention could also work with dedicated dial-up modem lines or the like for providing communication 103. Within the monitoring computer system 101 resides the empower monitor program 105 enabling this invention and a data base 104 for storage and retrieval of communicated information. With the user computer system 102 resides the empower program 106 enabling the user communication and the application program 107, upon which the user and vendor or developer are communicating. Additional programs, such as operating system, hardware and software driver routines, other application programs and the like may also be operating on or within both the user computer system 102 and the monitoring computer system 101.

Figure 2:
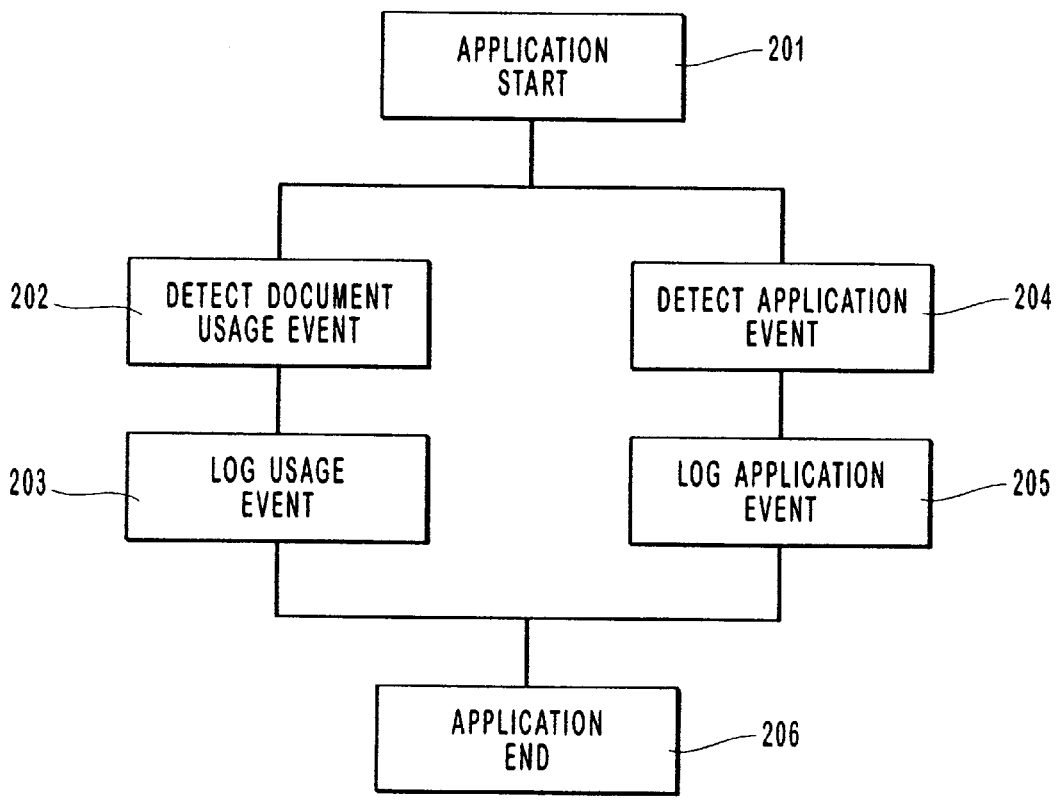
FIG. 2 is a top level flow diagram of the major components of the invention.

FIG. 2 shows the top level flow diagram showing the major component steps of this invention. The application program is started 201, whereupon this invention cooperates. When a particular designated document usage event in the application program is detected 202 the invention logs 203 the occurrence of this event in a log for communicating with the monitoring computer system 101. Typically, such usage events include, but are not limited to: viewing time, copy functions, printing, e-mailing, linking and/or jumping through the document and searching. When an application event is detected 204 the invention logs 205 the occurrence of this event in a log for communicating with the monitoring computer system 101. Typically, such application events include, but are not limited to: menu item clicks, button clicks, editing events, procedure values and returns. When the user has completed use of the application program or document the application ends 206, thereby terminating the execution of this invention.

Figure 3A:
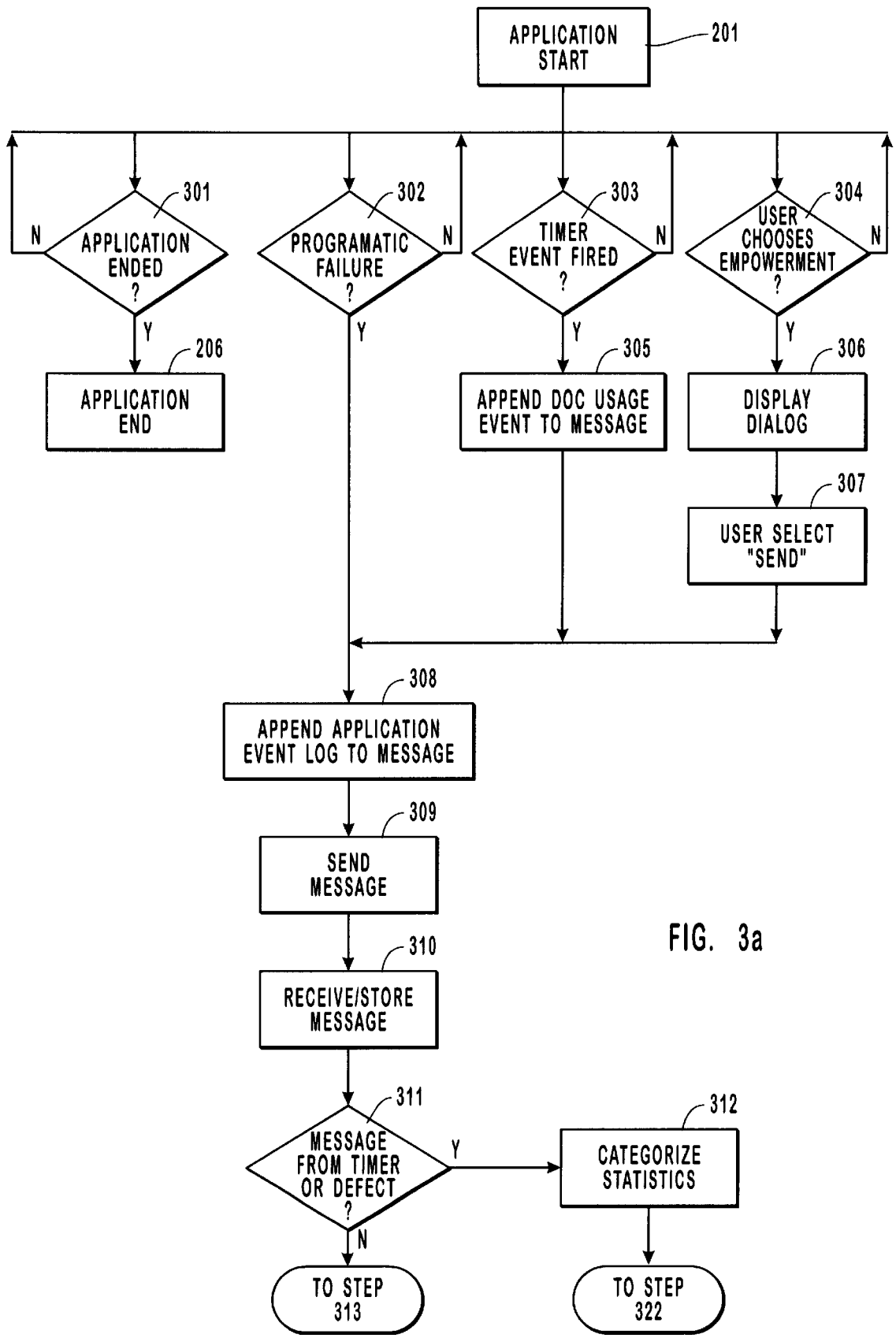
FIG. 3 is a detailed flow diagram of the invention.
Figure 3B:
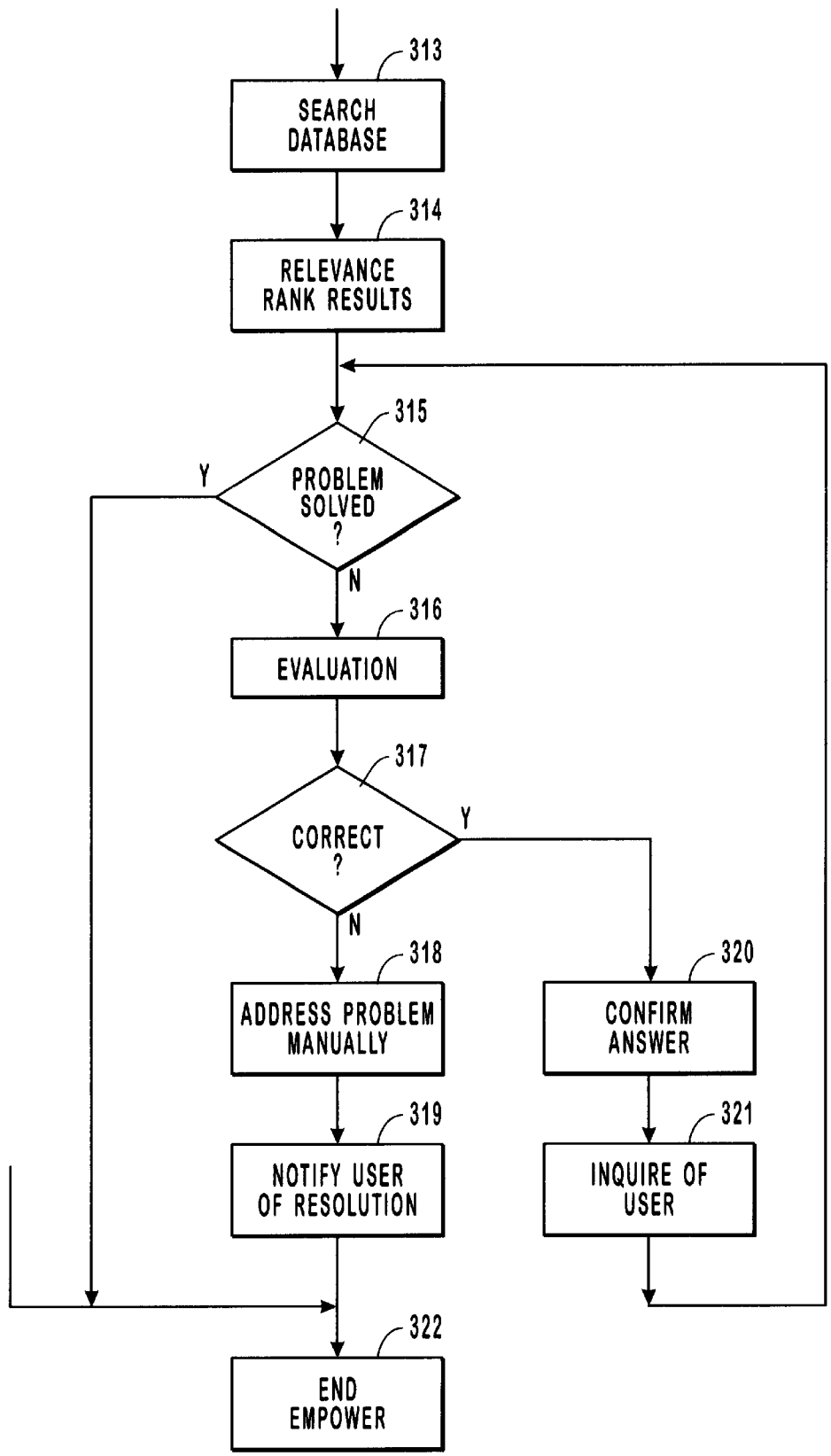

FIG. 3 shows the detailed flow diagram of the process of the invention. FIG. 3 has a FIG. 3a section showing the first twelve steps and a FIG. 3b section showing steps 13 through 22 of the invention. The division between FIG. 3a and FIG. 3b is done only for page size convenience and not to imply a functional break or limitation.

Once the application is started 201 this invention monitors the operation of the application for whether the user has chosen empowerment 304, that is whether the user has initiated communication; whether a timer event has fired 303; whether a programmatic failure has occurred 302; and whether the application has ended 301. If the user has completed use of the application and the application has ended the use of the invention process also terminates 206. If the user chooses empowerment 304 then a dialog display is provided 306 to permit the user to add comments and to indicate the type of communication the comments represent, such as: an enhancement request; a comment; a defect report; and/or a question. The dialog display 306 also provides a "send" button which the user may click to send the message to the vendor and/or the developer. If the timer event has fired 303 or occurred then the document usage event is appended 305 to the message. If a programmatic failure 302 has occurred then the application event log is appended 308 to the message. The application event log is also appended 308 to the message after the document usage event is appended 305 or the user has clicked the send 307 to send a communication to the vendor or developer. Following the appending of the application event 308, the message is sent 309 to the vendor or user. The sending of the message is accomplished using the communication channel discussed above, that is typically and preferably by e-mail, file transfer protocol and/or datagram protocols. Once sent the message is received and stored 310 by the monitoring computer system 101. A test 311 is performed to determine if the message is from either a timer (see step 303) or a defect (see step 302). If the test 311 is positive then statistics are stored and categorized 312 for later report generation. After which the process of the invention ends 322, or alternatively returns to the application start step 201. If the test 311 is negative then the data base is searched 313 and the results of the search are relevance ranked 314 with the top few hits sent with an automated response message back to the user. Based upon the search results, this automated response notifies the user that the message was received and that there may be certain actions that the user can take to fix, prevent, or work-around the problem. Once the user receives this message, if the user responds that the problem was solved 315, then no other communication dialog is required, therefore the program of this invention ends 322, or alternatively returns to the application start 210 step. If, however, the user does not respond that the problem has been solved, then, preferably, customer support processes of the vendor and/or developer proceed to evaluate 316 the user's message and the automated response provided in 314. A test 317 is performed to determine if the automatic response was correct. If correct, customer support confirms 320 the proper answer and inquires of the user in a follow-on message if the problem was solved 321, and the process returns to the problem solved test of step 315. If, however, the automated answer is determined to be incorrect, the problem is addressed manually 318 and the status of the problem as it using such indications as: unverified, verified, fixed, worked around, deferred until next release, rejected, resolved, and the like are logged. Next, the user is notified 319 of one or more of the following: the final resolution of the problem; when the feature is scheduled to be available if a feature request has been made; the answer if a question was posed; a fix availability if a defect report has been made. Following the notification of the user 319, the process of the invention ends 322, or alternatively returns to step 201 for detection of further defects, problems or user messages.

Figure 4:
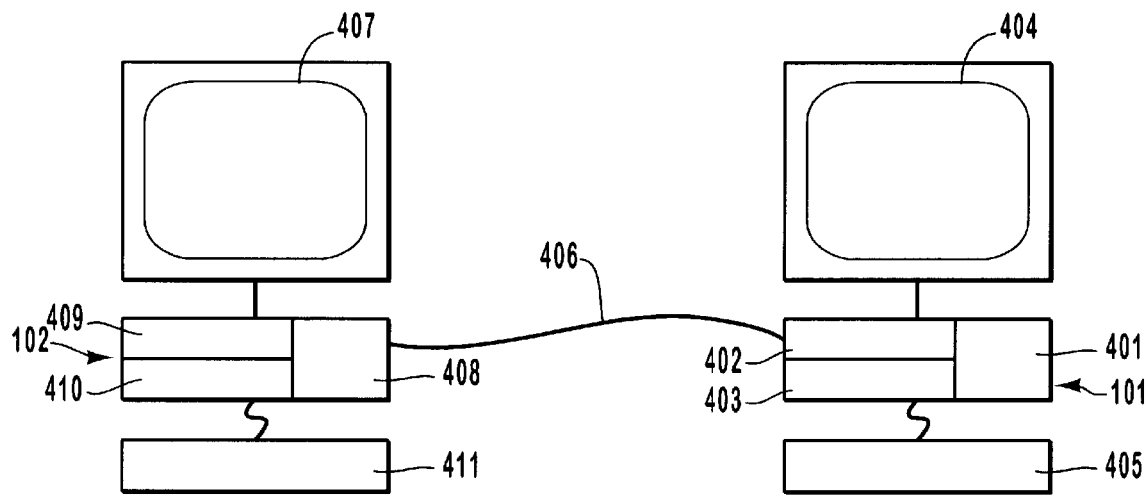
FIG. 4 is a system diagram of the computer system with which the software embodiment of the invention operates.

FIG. 4 shows the preferred computer systems used with this invention. The monitoring computer system 101 is shown with a disk long term storage unit 401, a processor 402, memory 403, a display device 404, an input device 405 and a communication channel 406 for communicating with the user computer system 102. Similarly, the user computer system is shown with a like long term storage unit 408, processor 409, memory 410, display device 407, and input device 411.

Figure 5:
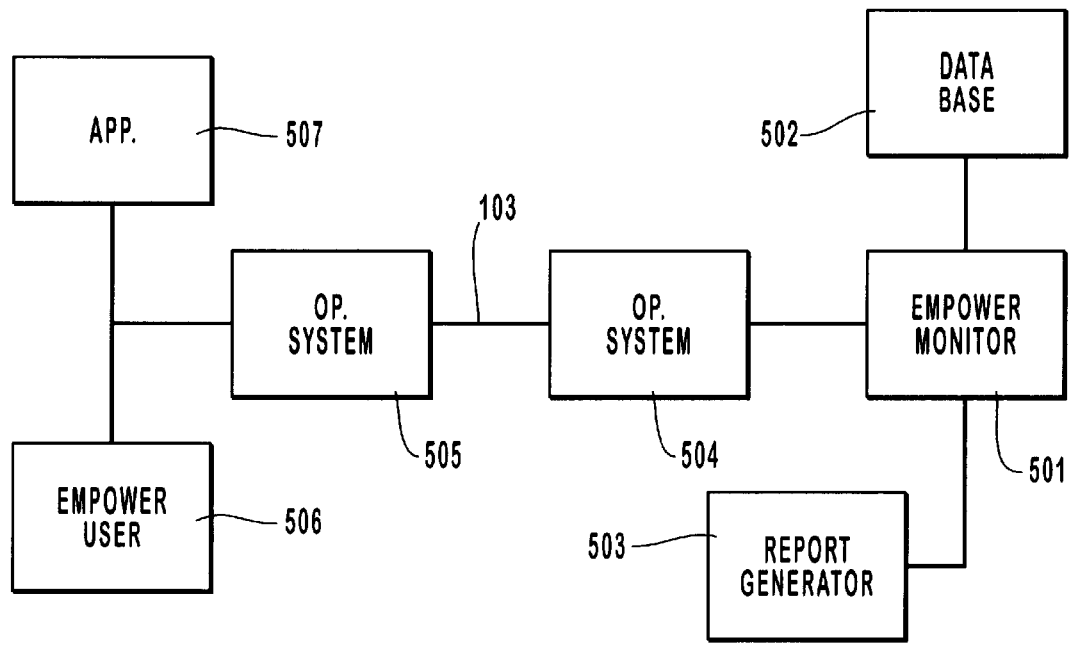
FIG. 5 is a system block diagram of the data communication paths used in the preferred embodiment of the invention.

FIG. 5 shows a system block diagram of the data communication is shown to provide the each computer system uses an operating system 504, 505 for controlling the use of software programs. The operating systems 504, 505 control the access of the invention to the communication channel 103. The monitoring computer system 101 routes data received from the user computer system 102 to the empower monitor 501 routine which interfaces with a stored data base 502 and a report generator routine 503. The user computer system 102 sends and receives information through the control of its operating system 505. Sent messages and received information is controlled by the empower user routine 506 which is linked to the application 507 being used by the user.

It is to be understood that the above described embodiment of the invention is merely illustrative of numerous and varied other embodiments which may constitute applications of the principles of this invention. Such other embodiments may be readily devised by those skilled in the art without departing from the spirit or scope of this invention, and it is the inventors' intent that such other embodiments be deemed to be within the scope of this invention.

Software Source Code Appendix

The following is one preferred embodiment of the software source code which accomplishes the steps of this invention. It is being included herein not to limit the scope of the invention but rather only to provide a fully enabled disclosure of the best mode of the invention known to the inventors which is sufficient to enable a person of ordinary skill in the art to make and practice the invention.

This embodiment of the invention is written in the Pascal computer language and is provided using two primary routines: Main and Empower.

```
unit Main;
interface
uses
    Windows, Messages, SysUtils, Classes, Graphics, Controls, Forms, Dialogs, OleCtrls,
    isp3, StdCtrls, Menus;
type
    TformExample = class(TForm)
        MainMenu1: TmainMenu;
        MenuFile: TmenuItem;
        MenuExit: TmenuItem;
        MenuHelp: TmenuItem;
        MenuEmpowerment: TmenuItem;
        Button1: Tbutton;
        Edit1: Tedit;
        procedure MenuExitClick(Sender: TObject);
        procedure FormCreate(Sender: TObject);
        procedure FormActivate(Sender: TObject);
        procedure FormDestroy(Sender: TObject);
        procedure MenuEmpowermentClick(Sender: TObject);
        procedure Button1Click(Sender: TObject);
        procedure Edit1Change(Sender: TObject);
    private
        FLog:       TStrings:
    public
        property Log        :TStrings
        read FLog
    end;
var
    FormExample: TFormExample;
implementation
uses Empower;
{$R *.DFM}
procedure TFormExample.MenuExitClick(Sender: TObject);
begin
    Close;
end;
procedure TFormExample.FormCreate(Sender:TObject);
begin
    FLog    ':=TStringList.Create;
end;
procedure TFormExample.FormActivate(Sender:TObject);
begin
    if (FLog<>nil) then FLog.Add ('Main: Activate');
    if (FLog <>nil) then FormEmpower.Log := FLog;
end;
procedure TFormExample.FormDestroy(Sender: TObject);
begin
    if (Flog <>nil) then FLog.Free;
end;
procedure TFormExample.MenuEmpowermentClick(Sender: TObject);
begin
    if (FLog <>nil) then FLog.Add ('Main: MenuEmpower');
    FormEmpower.Memo.Lines.Clear;
    FormEmpower.HostServer      = 'mail.jentec.com';
    if (FormEmpower.FromAddress =") then begin
        FormEmpower.FormAddress         :='use@someDomain.com';
    end;
    FormEmpower.ShowModal;
end;
procedure TFormExample.Button1Click(Sender: TObject);
begin
    if (FLog <>nil) then FLog.Add ('Main: SomeFunction click');
end;
procedure TFormExample.Edit1Change9Sender: TObject);
begin
        if (FLog <>nil) then FLog.Add ('Main: Some input field changed');
```

-continued

```
end;
end.
unit Empower;
interface
uses
      Windows, Messages, SysUtils, Classes, Graphics, Controls, Forms, Dialogs,
      StdCtrls, ExtCtrls, IniFiles, OleCtrls, isp3, Status, Mapi;
      const
           DEFAULT_EMAIL_ADDRESS     = 'info@jentec.com';
           DEFAULT_CC_ADDRESS        ='';
           DBFAULT_HOST_ADDRESS      = 'mailjentec.com';
type
      TFormEmpower = class(TForm)
      GroupBox3: TGroupBox;
      StaticText3: TStaticText;
      StaticText4: TStaticText;
      EmailAddress: TEdit;
      StaticText1: TStaticText;
      Panel5: TPanel;
      ButtonSend: TButton;
      ButtonCancel: TButton;
      CommunicationType: TRadioGroup;
      Memo: TMemo;
      SMTP1: TSMTP;
      procedure FormCreate(Sender: TObject);
      procedure FormClose(Sender: TObject; var Acfion: TCloseAction);
      procedure SMTP1Error(Sender: TObject; Number: Smallint;
           var Description: WideString; Scode: Integer; const Source,
           HelpFile: WideString; HelpContext: Integer;
           var CancelDisplay: WordBool);
      procedure SMTP1 StateChanged(Sender: TObject; State: Smallint);
      procedure SMTP1DocInput(Sender: TObject; const DocInput: DocInput);
           procedure ButtonSendClick(Sender: TObject);
      procedure FormActivate(Sender: TObject);
      procedure ButtonCancelClick(Sender: TObject);
private
           SMTPError:      Boolean;
           FLog:           TStrings;
           procedure    SendViaMapi;
           procedure    SendViaSmtp;
public
           FormStatus                    : TFormStatus;
           FromAddress: String;
           HostServer:     String;
           UseMapi:        Boolean;
           procedure Loadsettings (Sender: TObject);
           procedure SaveSettings (Sender: TObject);
           property Log         : TStrings
     read FLog            write FLog;
end;
var
FormEmpower: TFormEmpower;
implementation
{$R *.DFM}
{When calling a component method which maps onto an OLE call, NoParam substitutes
for an optional parameter. As an alternative to calling the component method, you
may access the component's OLEObject directly -
i.e., Component.OLEObject.MethodName(,Foo,,Bar) }
function NoParam: Variant;
begin
     TVarData(Result).VType := varError;
     TVarData(Result).VError := DISP_E_PARAMNOTFOUND;
end;
procedure TFormEmpower.FormCreate(Sender: TObject);
begin
     LoadSettings (Sender);
     SMTPError := False;
end;
procedure   TFormEmpower.LoadSettings (Sender: TObject);
var
     WinIni:        TIniFile;
begin
     WinIni := TIniFile.Create ('IKnow.ini');
     with WirIni do begin
          FormEmpower.EmailAddress .Text := ReadString ('Preferences', 'EmailAddress',
     '');
     end;
     WinIni.Free;
end;
```

-continued

```
procedure TFormEmpower.FormClose(Sender: TObject;
var Action: TCloseAction);
begin
    FromAddress    := EmailAddress.Text;
    SaveSettings (Sender);
    while (SMTP1.Busy) AND (SmtpError = False) do Application.ProcessMessages;
    if (SmtpError = False) AND (SMTP1.State = prcConnected) then SMTP1.Quit;
end;
procedure  TFormEmpower.SaveSettings (Sender: TObject);
var
    WinIni:      TIniFile;
begin
    WinIni := TIniFile.Create ('IKnow.ini');
    with WinIni do begin
        WriteString ('Preferences', 'EmailAddress', FormEmpower.EmailAddress.Text);
    end;
    WinIni.Free;
end;
procedure TFormEmpower. SendViaMapi;
var
    MapiMessage:          TMapiMessage;
    MapiTo:               array[0..1] of TMapiRecipDesc;
    MapiFrom:             TMapiRecipDesc;
    MError:               Cardinal;
    bufMailTo:            array[1..256] of Char;
    bufMalFrom:           array[1..256] of Char;
    butMailCC:            array[1..256] of Char;
    bufMailSubject:       array[1..256] of Char;
    bufMailID:            array[1..256] of Char;
    messageText:          PChar;
begin
StrPCopy (@bufMailTo,      DEFAULT_EMAIL_ADDRESS);
StrPCopy (@bufMalFrom,     EmailAddress.Text);
StrPCopy (@bufMailCC,      EmailAddress.Text);
StrPCopy (@bufMailSubject,
CommunicationType.Items[CommunicationType.ItemIndex]);
    StrPCopy (@bufMailID,    Format('%s', [DateTimeToStr(Now)]));
    with MapiTo[0] do begin
        ulReserved      := 0;
        ulRecipClass := MAPI_TO;
        lpszName               :=nil;
        lpszAddress         := @bufMailTo;
        ulEIDSize           :=0;
        lpEntryID           := nil;
    end;
    with MapiTo[1] do begin
        ulReserved      := 0;
        ulRecipClass := MAPI_CC
        lpszName               :=nil;
        lpszAddress         := @bufMailCC;
        ulEIDSize           :=0;
        lpEntryID           := nil;
    end;
    with MapiFrom do begin
        ulReserved            := 0;
        ulRecipClass := MAPI_ORIG;
        lpszName         := nil;
        lpszAddress         := @bufMailFrom;
        ulEIDSize           :=0;
        lpEntryID           := nil;
    end;
    GetMem (messageText, Length (Memo.Text) + 1);
    try
        StrPCopy (messageText, Memo.Text);
        with MapiMessage do begin
            ulReserved              := 0;
            lpszSubject             := @bufMailSubject;
            lpszNoteText           :=messageText;
            lpszMessageType        :=nil;
            lpszDateReceived       :=nil;
            lpszConversationID     := @bufMailID;
            flFlags                 :=0;
            lpOriginator           := @MapiFrom;
            nRecipCount            := 2;
            lpRecips                := @MapiTo;
            nFileCount             := 0;
            lpFiles                :=nil;
        end;
        MError := MapiSendMail (0,0,MapiMessage, MAPI_DIALOG OR
```

-continued

```
MAPI_LOGON_UI OR MAPI_NEW_SESSION, 0);
        if (MError <>0) then begin
            raise Exception.CreateHelp ('Error sending mail:', MError);
        end;
    finally
        FreeMem (messageText, Length (Memo.Text) + 1);
    end;
end;
procedure TFormBmpower.SendViaSmtp;
begin
    if (FormStatus <>nil) then begin
        FormStatus.StartStatus ('Waiting for a clear channel...');
    end;
    with SMTP1 do begin
        try
            while (Busy) AM) (SmtpError = False) do Application.ProcessMessages;
            if (State <>prcConnected) then begin
                if (HostServer <>'') then begin
                    RemoteHost := HostServer;
                end else begin
                    RemoteHost := DEFAULT_HOST_ADDRESS;
                end;
                SmtpError    := False;
                if (FormStatus <>nil) then begin
                    FormStatus.StatusLine.Caption := 'Lookup' + RemoteHost;
                    if (FormStatus.UpdateProgress (1) = True) then begin
                        Cancel;
                        Exit;
                    end;
                end;
                Connect (NoParam, NoParam);
            end;
            while (State <prcConnected) AND (Busy) AND (SmtpError = False) do
Application.ProcessMessages;
            if (SmtpError = False) then begin
                DocInput.Headers.Clear;
                DocInput.Headers.Add ("To',
DEFAULT_EMAIL_ADDRESS);
                DocInput.Headers .Add ("From',
EmailAddress.Text);
                DocInput.Headers.Add ('CC',
EmailAddress.Text);
                DocInput.Headers.Add ('Subject',
CommunicationType.Items[CommunicationType.ItemIndex]);
                DocInput.Headers.Add ('Message-Id',    Format('%s',
[DateTimeToStr(Now)]));
                DocInput.Headers.Add ('Content-Type',    'TEXT/PLAIN
charset=US-ASCII');
                if (FLog = nil) then begin
                    SendDoc (NoParam, DocInput.Headers, Memo.Text, '', '');
                end else begin
                    SendDoc (NoParam, DocInput.Headers, FLog.Text +
Chr(13) + Memo.Text, '','');
                end;
                while (DocInput.State <icDocEnd) AND (Busy) AND (SmtpError
= False) do Application.ProcessMessages;
                if (SmtpError = False) AND (FormStatus <>nil) then
FormStatus.Close;
                Close;
            end;
        except
            SmtpError    := True;
            Cancel;
        end;
    end;
end;
procedure TFormEmpower.ButtonSendClick(Sender: TObject);
begin
    if (UseMapi = True) then begin
        SendViaMapi;
    end else begin
        SendViaSmtp;
    end;
end;
procedure TFormEmpower. SMTP1Error(Sender: TObject; Number: Smallint;
var Description: WideString; Scode: Integer; const Source,
HelpFile: WideString; HelpContext: Integer; var CancelDisplay: WordBool);
begin
    CancelDisplay           := True;
```

-continued

```
        SmtpError           := True;
    if (FormStatus <>nil) then begin
        FormStatus.StatusLine.Caption := Description +': '+IntToHex(Number, 16);
        FormStatus.UpdateProgress (99);
    end;
end;
procedure TFormEmpower.SMTP1Statechanged(Sender: TObject; State: Smallint);
begin
    case State of
        prcConnecting: begin
            if (FormStatus <>nil) then begin
                FormStatus.StatusLine.Caption := 'Lookup' +
SMTP1.RemoteHost;
                if (Formstatus.UpdateProgress (5) = True) then begin
                    SMTP1.Cancel;
                end;
            end;
        end;
        prcResolvingHost: begin
            if (FormStatus <>nil) then begin
                FormStatus.StatusLine.Caption := 'Resolving' +
SMTP1.RemoteHost + 'to an address';
                if (FormStatus.UpdateProgress (10) = True) then begin
                    SMFP1 Cancel,
                end;
            end;
        end;
        prcHostResolved: begin
            if (FormStatus <>nil) then begin
                FormStatus.StatusLine.Caption := 'Connecting to ' +
SMTP1.RemoteHost;
                if (FormStatus.UpdateProgress (15) = True) then begin
                    SMTP1.Cancel;
                end;
            end;
        end;
        prcConnected: begin
            if (FormStatus <>nil) then begin
                FormStatus.StatusLine.Caption := 'Connected to ' +
SMTP1.RemoteHost;
                if (FormStatus.UpdateProgress (20) = True) then begin
                    SMTP1 .Cancel;
                end;
            end;
        end;
        prcDisconnecting: begin
        end;
        prcDisconnected: begin
        end;
    end;
    Application.ProcessMessages;
end;
{ The DocInput event is called each time the DocInput state changes during a mail transfer.
DocInput holds all the information about the current transfer, including the headers, the
number of bytes transferred, and the message data itself. Although not shown in this example,
you may call DocInput's SetData method if DocInput.State = icDocData to encode the data
before
each block is sent. }
procedure TFormEmpower. SMTP1DocInput(Sender: TObject;
const DocInput: DocInput);
begin
    case DocInput.State of
        icDocBegin: begin
            if (FormStatus <>nil) then begin
                FormStatus.StatusLine.Caption := 'Sending mail';
                if (FormStatus.UpdateProgress (21) = True) then begin
                    SMTP1.Cancel;
                end;
            end;
        end;
        icDocHeaders: begin
            if (FormStatus <>nil) then begin
                FormStatus.StatusLine.Caption := 'Sending address information';
                if (FormStatus.UpdateProgress (22) = True) then begin
                    SMTP1.Cancel;
                end;
            end;
        end;
        icDocData: begin
```

-continued

```
            if (FormStatus <>nil) AND (DocInput.BytesTotal >0) then begin
                FormStatus.StatusLine.Caption := Format ('Sending data: %d of
%d bytes',
                    [Trunc(DocInput.BytesTransferred),
Trunc(DocInput.BytesTotal)]);
                if (FormStatus.UpdateProgress
(Trunc(DocInput.BytesTransferred/DocInput.BytesTotal*100)-1) = True) then begin
                    SMTP1.Cancel;
                end;
            end;
        end;
        icDocEnd:begin
            if (FormStatus <>nil) then begin
                if SMTPError then begin
                    FormStatus.UpdateProgress (100);
                    ShowMessage ('Transfer aborted:'+
FormStatus.StatusLine.Caption);
                end else begin
                    FormStatus.StatusLine.Caption : = 'Empowerment
complete';
                    FormStatus.UpdateProgress (99);
                end;
            end;
        end;
    end;
    Application.ProcessMessages;
end;
procedure TFormEmpower.FormActivate(Sender: TObject);
begin
    EmailAddress.Text := FromAddress;
end;
procedure TFormEmpower.ButtonCancelClick(Sender: TObject);
begin
    Close;
end;
end.
```

We claim:

1. A method for enabling communication between users of computer application programs and developers of computer application programs, comprising the steps of:
   (A) testing whether a user has initiated communication and if the user has initiated communication providing a dialog display for the user's addition of comments;
   (B) testing whether an event timer has fired and if said event timer has fired appending a document usage event to a message;
   (C) testing whether a programmatic failure has occurred and if a programmatic failure has occurred appending a application event log to said message;
   (D) testing whether the process of an application program has ended and if the process of an application program has ended terminating the execution of this process;
   (E) detecting a particular usage of a document, wherein said detected usage is a usage selected from the group consisting of viewing, copying, printing, e-mailing, linking from another document, jumping through said document, and searching said document;
   (F) logging said detected usage of a document;
   (G) compiling statistics of said logged usage;
   (H) sending a message communicating said logged detected usage of said document;
   (I) receiving said sent message communicating said logged detected usage of said document; and
   (J) storing said received message.

2. A method for enabling communication between users of computer application programs and developers of computer application programs, as recited in claim 1, wherein said detecting usage step further comprises detecting whether a particular document has been open for a predetermined period of time.

3. A method for enabling communication between users of computer application programs and developers of computer application programs, as recited in claim 1, wherein said detecting usage step further comprises detecting whether a portion of a particular document has been copied.

4. A method for enabling communication between users of computer application programs and developers of computer application programs, as recited in claim 1, wherein said detecting usage step further comprises detecting whether a portion of a particular document has been printed.

5. A method for enabling communication between users of computer application programs and developers of computer application programs, as recited in claim 1, wherein said detecting usage step further comprises detecting whether a portion of a particular document has been e-mailed.

6. A method for enabling communication between users of computer application programs and developers of computer application programs, as recited in claim 1, wherein said detecting usage step further comprises detecting whether a particular document has been searched.

7. A method for enabling communication between users of computer application programs and developers of computer application programs, comprising the steps of:
   (A) testing whether a user has initiated communication, whether an event timer has fired, and whether a programmatic failure has occurred;
   (B) detecting a defect in the execution of a computer application program;
   (C) logging said detected defect;
   (D) compiling statistics of said logged detected defect;

(E) sending a message communicating said logged defect from a user to a developer of said computer application program;

(F) receiving said sent message, by a developer of said computer application program, communicating said logged defect; and (G) storing said received message.

8. A method for enabling communication between users of computer application programs and developers of computer application programs, as recited in claim 7, wherein said detecting defects step further comprises (i) debugging the application program during program execution;

(ii) storing debugging steps to provide a history of the program defect for later reproduction; and (iii) comparing said stored debugging steps with expected steps.

9. A method for enabling communication between users of computer application programs and developers of computer application programs, comprising the steps of:

(A) testing whether a programmatic failure has occurred or a timer event has fired and appending an application event log to a message if a programmatic failure has occurred or appending a document usage event to a message if a timer event has fired;

(B) providing a user message interface to a computer application program;

(C) providing a communication dialog with a user through said message interface, wherein said communication dialog further comprises the steps of:
  (i) providing an enhancement request function;
  (ii) providing a comment message function;
  (iii) providing a defect reporting function; and
  (iv) providing an inquiry function;

(D) sending a user message from a user;

(E) receiving said user message by a developer; and (F) storing said received message.

10. A system for providing communication between users of computer application programs and developers of computer application programs, comprising:

(A) a user computer system, wherein said user computer system can execute an application program and wherein said user computer system sends a message, and wherein said message includes an appended application event log, to a monitoring computer system;

(B) a monitoring computer system for receiving a message from said user computer system wherein said monitoring computer system provides a communication link between a user of a computer application program and a developer of said computer application program; and (C) a communication channel connecting said user computer system with said monitoring computer system.

11. A system for providing communication between users of computer application programs and developers of computer application programs, as recited in claim 10, wherein said communication channel comprises electronic mail.

12. A software program for receiving and processing communication messages between an application program user and an application program developer, the program comprising:

(A) a defect detection routine;

(B) a usage reporting routine, wherein said usage reporting routine provides reporting of events selected from the group consisting of viewing time, copy functions, printing, e-mailing, linking, jumping and searching in a document;

(C) a message managing routine providing a communication link between an application program user and an application program developer;

(D) a statistical analysis routine for analyzing defects, usage and messages reported; and (E) a reporting routine for providing the application program developer information based on the statistical analysis provided by said statistical analysis routine.

13. A software program for receiving and processing communication messages between an application program user and an application program developer, as recited in claim 12 wherein said defect detection routine further comprises:

(i) a programmatic failure debugger for identifying programmatic failures;

(ii) a programmatic failure reporter for reporting programmatic failures; and (iii) a communication handler for communicating programmatic failure reports to the application program developer.

14. A software program for receiving and processing communication messages between an application program user and an application program developer, as recited in claim 12, wherein said usage reporting routing frtther comprises:

(i) a usage timer;

(ii) a usage event document;

(iii) a communication message having said usage event document appended into said communication message;.

15. A software program for receiving and processing communication messages between an application program user and an application program developer, as recited in claim 12, wherein said message managing routine further comprises:

(i) a routine for appending documents to a message;

(ii) a routine for sending said message to the application program developer;

(iii) a storage routine for storing said message in a digital computer; and (iv) a database routine for comparing said appended documents to a history of past documents.

* * * * *